United States Patent
Dentamaro et al.

(10) Patent No.: US 12,468,004 B2
(45) Date of Patent: Nov. 11, 2025

(54) RADIOCOMMUNICATION DEVICE OR PASSIVE OBJECT IN A CONFINED ENVIRONMENT

(71) Applicant: NEXTOME S.R.L., Conversano (IT)

(72) Inventors: Vincenzo Dentamaro, Bari (IT); Domenico Colucci, Noci (IT); Giangiuseppe Tateo, Conversano (IT); Pietro Boccadoro, Bari (IT); Laura Notarangelo, Conversano (IT)

(73) Assignee: NEXTOME S.R.L., Conversano (IT)

( * ) Notice: Subject to any disclaimer, the term of this patent is extended or adjusted under 35 U.S.C. 154(b) by 361 days.

(21) Appl. No.: 18/146,132

(22) Filed: Dec. 23, 2022

(65) Prior Publication Data

US 2023/0204707 A1 Jun. 29, 2023

(30) Foreign Application Priority Data

Dec. 28, 2021 (EP) .................................... 21218000

(51) Int. Cl.
*G01S 5/02* (2010.01)
*G01S 5/06* (2006.01)
*G01S 5/14* (2006.01)

(52) U.S. Cl.
CPC .......... *G01S 5/0218* (2020.05); *G01S 5/0244* (2020.05); *G01S 5/06* (2013.01); *G01S 5/14* (2013.01)

(58) Field of Classification Search
CPC ........ G01S 5/0218; G01S 5/0244; G01S 5/06; G01S 5/14

(Continued)

(56) References Cited

U.S. PATENT DOCUMENTS 9,226,257 B2 * 12/2015 Edge .................... H04L 67/52
10,303,905 B2 5/2019 Lombardi et al.

FOREIGN PATENT DOCUMENTS

AU 2008318903 A1 * 5/2010 ............ H04W 8/005
CA 2880984 A1 * 2/2014 ............ H04W 48/16

(Continued)

OTHER PUBLICATIONS

Copy of European Search Report for EP21218000 dated Aug. 11, 2022, Munich, DE.

(Continued)

*Primary Examiner* — Harry K Liu
(74) *Attorney, Agent, or Firm* — ArentFox Schiff LLP; Michael Fainberg (57) ABSTRACT

Methods are provided for locating a mobile radio communication device with a receiver detecting electromagnetic identification signals broadcast by transmitters in a confined environment, or an object with a transmitter periodically broadcasting an electromagnetic identification signal detectable by a plurality of receivers of a localization infrastructure. The receiver of the mobile radiocommunication device, or the plurality of receivers of the localization infrastructure, determine identification data indicative of strength of received identification signals, forming an identification data matrix which is processed to obtain an identification data matrix with reduced noise, from which a characteristic identification vector is extracted including a characteristic identification data element for each transmitter or receiver. Position coordinates of the mobile radio communication device or of the object are determined by minimizing an error in calculating distances between position of the mobile radio communication device, or of the object, and position of at least three transmitters, respectively receivers.

22 Claims, 4 Drawing Sheets

(58) Field of Classification Search
USPC .......................................................... 342/451
See application file for complete search history.

(56) References Cited

FOREIGN PATENT DOCUMENTS

| | | | | | |
|---|---|---|---|---|---|
| CA | 2702251 | C | * | 11/2015 | ............ H04W 8/005 |
| CN | 101126805 | A | * | 2/2008 | |
| DE | 102017001570 | A1 | | 8/2018 | |
| EP | 3052957 | B1 | | 3/2018 | |
| WO | WO-2024238134 | A1 | * | 11/2024 | ........... H04W 5/0219 |

OTHER PUBLICATIONS

Ma Lin et al., Radio Map Noise Reduction Method Using Hankel Matrix for WLAN Indoor Positioning System, 2017 IEEE Global Communications Conference (GLOBECOM), Dec. 4, 2017, pp. 1-7, IEEE, XP033299682.

Ma Lin et al., Radio Map Recovery and Noise Reduction Method for Green WiFi Indoor Positioning System Based on Inexact Augmented Lagrange Multiplier Algorithm, 2015 IEEE Global Communications Conference (GLOBECOM), Dec. 6, 2015, pp. 1-5, IEEE, XP032872751.

* cited by examiner

RADIOCOMMUNICATION DEVICE OR PASSIVE OBJECT IN A CONFINED ENVIRONMENT

CROSS REFERENCE TO RELATED APPLICATION

This application claims priority to and benefit of European Patent Application No. 21218000.4 filed Dec. 28, 2021, the contents of which are incorporated by reference in their entirety.

FIELD OF THE INVENTION

The present invention relates to systems for localization and tracking of entities in confined environments, e.g., indoor spaces, by means of radio waves.

More specifically, the subject of the present invention is a method for locating a mobile radiocommunication device in a confined environment, particularly a personal radiocommunication mobile device that is held by a user, as well as a method for locating an object in a confined environment.

BACKGROUND OF THE INVENTION

The aim of a localization system is to detect the presence of entities (objects, people) within an environment and to track their movements.

Signal transmission by means of radio waves in an environment is subject to different kind of disturbance phenomena that may be caused by the environment as well as by internal system components. The most common environmental disturbance phenomena include multipath fading, that is the existence of multiple paths that are followed by the electromagnetic wave, reflection, diffraction, absorption by some molecules such as water molecules. In addition to environmental causes, there are the internal disturbances of the system from the circuit components of the transmitter and receiver devices that are associated with the object to be tracked and to the localization devices associated with the localization environment, as well as the external disturbances due to all other radiation sources, either natural or artificial. Both types of disturbance have a variable and random nature and have effects on the quality of information because they are added to the useful information signal.

At present, there are solutions for detecting the presence of objects inside an environment and for tracking their movements that use short and medium range electromagnetic transmission technologies of wireless signals, for example the WiFi technology. The localization process, regardless of the transmission technologies used, can make use of various alternative methodologies, such as multilateration, fingerprinting, croudsourcing. DE 10 2017 001570 A1 proposes an object localization solution that includes hardware, receiver and server and is based on indoor localization techniques that exploit the RSSI value of the signal but is compatible only with hardware owned by the same Applicant, and is not compatible with the sensors most commonly available on the market. U.S. Pat. No. 10,303,905 B2 proposes a solution that uses a wireless access node network through which the mobile communication devices present in the environment covered by the network are located with methods based on the fingerprinting technique. By exploiting the multiplicity of mobile communication devices present, whose position is monitored, objects are tracked using crowd-sourcing techniques. To approximate the position of objects, the positions of mobile communication devices that detect such objects are used.

Disadvantageously, this known technique does not address the problem of the signal noise received by the location devices, particularly in a closed environment, and furthermore requires a preliminary mapping step of the electromagnetic location signals transmitted into the environment, necessary for the application of the fingerprinting technique.

The purpose of the present invention is to improve the accuracy (in terms of repeatability and precision) of a method for locating entities in real time in an environment, in particular a closed environment, using a simple, low cost and scalable system, in particular by removing disturbances from multiple propagation paths.

A further purpose is to perform the location of an entity by minimizing energy consumption and electromagnetic pollution by the location system.

SUMMARY OF THE INVENTION

According to the present invention, these objects are achieved thanks to a method for locating a mobile radio communication device in a confined environment as described and claimed herein.

A further object of the present invention is a method for locating an object in a confined environment.

Particular embodiments are also described

In summary, the present invention relates to methods for the localization of a mobile radio communication device, provided with a receiver adapted to detect electromagnetic identification signals broadcast by transmitters present in a confined environment, or of an object with which a transmitter is associated which is capable of periodically broadcasting an electromagnetic identification signal that can be detected by a plurality of receivers of a localization infrastructure, present in a confined environment.

Specifically, a method for locating a mobile radiocommunication device in a confined environment, in particular a personal mobile radiocommunication device in the possession of a user, provided with means for receiving electromagnetic signals, comprises providing in the environment a localization infrastructure including a plurality of electromagnetic signal transmitters installed in predetermined locations in the environment, the transmitters being each adapted to periodically broadcast a respective electromagnetic identification signal capable of being detected by the receiving means of the mobile radio communication device.

Correspondingly, a method for locating an object in a confined environment comprises providing transmitting means coupled to the object, adapted to periodically broadcast an electromagnetic identification signal, and providing a localization infrastructure including a plurality of electromagnetic signal receivers in the environment, which are adapted to detect the identification signal over time.

In the latter case, the plurality of receivers of the localization infrastructure advantageously includes a first subset of fixed receivers, installed in predetermined sites of the environment, and a second subset of mobile receivers within the environment, the second subset of mobile receivers including mobile radiocommunication devices at least temporarily present in the environment and located in it, even more advantageously a second subset of mobile receivers including personal mobile radiocommunication devices in the possession of users at least temporarily present in the environment and located in it by means of a method of localization of the invention. The personal mobile radiocommunication devices can also be localized through a different localization method, for example a method disclosed in the European patent EP 3 052 957, entitled "ENHANCED INDOOR LOCALIZATION METHOD" of the same Applicant.

In summary, the present invention is based on a localization methodology comprising mainly a "signal filtering", a spatial localization technique of "multilateration" and possibly a filtering method of the "particle filter" or sequential Monte Carlo type, combined between them optimally in order to recognize the position of an entity.

More particularly, the present invention is based on the principle of determining, by the receivers that carry out the localization method, a plurality of identification data, indicative of the strength of a received identification signal, broadcast by the transmitters that carry out the localization method, of filtering the noise of the received identification data through processing performed by a computer program, and of determining the position coordinates of the mobile radio communication device or of the object in a predetermined reference system by minimizing the error in the calculation of the distances between the aforementioned position coordinates and the position of each of at least three receivers or transmitters of the identification signal in solving a multilateration problem, in which the distance between the position of the mobile radio communication device and the position of each of at least three transmitters, or the distance between the position of the object and the position of each of at least three receivers, is determined on the basis of the identification data of the respective transmitters or receivers.

In a method for locating a mobile radio communication device, the determination, by the receiving means of the mobile radio communication device, of a plurality of identification data, indicative of the power of the received identification signal, takes place starting from a plurality of identification signals broadcast by at least three transmitters of a plurality of transmitters installed in the environment in which the localization takes place, in a predetermined time interval or starting from a predetermined plurality of identification signals broadcast by at least three transmitters over time. Respective plurality of identification data acquired by the at least three transmitters form a matrix of identification data, whose noise is filtered (reduced) to obtain an identification data matrix with reduced noise, from which a characteristic identification vector is extracted that includes a characteristic identification data element for each of said three transmitters. The determination of the position coordinates of the mobile radio communication device in a predetermined reference system of the environment to which the transmitters belong takes place by minimizing the error in calculating the distances between the position of said mobile radio communication device and the position of each of said at least three transmitters in solving a multilateration problem in which the distance between the position of said mobile radio communication device and the position of each of said at least three transmitters is determined according to a predetermined function of the characteristic identification data element of the respective transmitter.

In a method for locating an object, the determination by at least three receivers of a plurality of receivers of the localization infrastructure of a plurality of identification data, indicative of the strength of the received identification signal, takes place starting from a plurality of identification signals broadcast by transmitting means coupled to the object and received in a predetermined time interval or starting from a predetermined plurality of identification signals broadcast by transmitting means coupled to the object and received over time. Respective pluralities of identification data acquired from at least three receivers form a matrix of identification data, whose noise is filtered (reduced) to obtain an identification data matrix with reduced noise, from which a characteristic identification vector is extracted that includes a characteristic identification data element for each of said at least three receivers. The determination of the position coordinates of the object in a predetermined reference system of the environment to which the receivers belong takes place by minimizing the error in calculating the distances between the position of said object and the position of each of said at least three receivers in solving a multilateration problem in which the distance between the position of said object and the position of each of said at least three receivers is determined according to a predetermined function of the characteristic identification data element of the respective receiver.

In both cases of localization of a mobile radio communication device and localization of an object, the methods also include the application of a sequential Monte Carlo method to the determined position coordinates of said object, with the aim of improving accuracy and eliminating the possibility of localization in impossible areas, for example walls or other obstacles.

Advantageously, in a method for locating a mobile radio communication device, the current position of the related transmitter and a timestamp of detection of the related identification signal are also associated with each identification data element.

Advantageously, in a method for locating an object, each identification data element is also associated with the current position of the related receiver and a timestamp of detection of the related identification signal.

In a method for locating a mobile radiocommunication device, the receiving means of the mobile radiocommunication device are designed to determine an identification data element indicative of the strength of the received signal if said strength is greater than a predetermined threshold.

In a method for locating an object, each receiver of the localization infrastructure is designed to determine an identification data element indicative of the received signal strength if said strength is greater than a predetermined threshold.

In a method for locating a mobile radio communication device, the extraction of a characteristic identification vector includes the extraction for each transmitter of a predetermined plurality of identification data with reduced noise acquired in the most recent time and the calculation of a characteristic identification data element starting from said plurality of identification data with reduced noise.

In a method for locating an object, the extraction of a characteristic identification vector includes the extraction for each receiver of a predetermined plurality of identification data with reduced noise acquired in the most recent time and the calculation of a characteristic identification data element starting from said plurality of identification data with reduced noise.

In both methods, the calculation of a characteristic identification data element starting from a plurality of identification data with reduced noise comprises the calculation of the average of the plurality of identification data with reduced noise acquired in the most recent time, for example the calculation of the average of the last two identification data element with reduced noise acquired over time.

In both methods, the reduction of the noise from the identification data matrix can be based on a technique of singular value decomposition of the identification data matrix or on the application of an denoising autoencoder to the identification data matrix, taking into account at the same time of the identification signals received over time and related to different transmitters (in the case of locating a mobile radio communication device) or to different receivers (in the case of locating an object).

The technique of singular value decomposition of the identification data matrix, and, in particular, the technique of compact singular value decomposition of the identification data matrix, allows to determine a diagonal singular matrix, of which a predetermined subset of singular values is zeroed, based on the percentage of information contained in the identification data matrix to be kept (adopting a truncation criterion as a function of the ratio between the single singular value and the cumulative sum of all singular values). Then a lower-ranking approximate identification data matrix is calculated, which corresponds to an identification data matrix with reduced noise.

On the contrary, in the application of a denoising autoencoder to the identification data matrix, the denoising autoencoder comprises a neural network which implements an encoder of the identification data matrix encoder into a latent representation matrix of the identification data, and a decoder of the latent representation matrix of the identification data into an output identification data matrix with reduced noise. The respective activation functions of the weighted linear combinations of the identification data of the identification data matrix and of the latent representation matrix of the identification data, are preferably a sine activation function and a linear activation function. The denoising autoencoder is trained by feeding an input identification data matrix in which random noise components extracted from a Gaussian noise distribution are added to the identification data matrix, and a reconstructed identification data matrix is computed by the denoising autoencoder, minimizing an error function which is the difference between the identification data matrix and the reconstructed identification data matrix.

Therefore, the present invention overcomes the disadvantages of existing technologies by providing an advanced filtering system, achievable through a computer program (via software) and a spatial localization technique based on the principle of multilateration, which does not require any preliminary fingerprinting step and/or mapping of the environment, thus making it possible to quickly adapt a localization system to any variation of the configuration of an environment.

The advantages achieved by the present invention are therefore a greater scalability of the technology due to the replacement of the known fingerprinting technique with multilateration techniques, as well as a reduction in time and costs of installing a localization system since the training step characteristic of the methodologies based on fingerprinting is not needed.

Advanced filtering algorithms, such as the singular value decomposition technique or the denoising autoencoder, to reduce the effects of multiple paths of identification signals, and the resolution of a multilateration problem through methodologies in the domain of least squares nonlinear optimization problems, allow to maintain the simplicity of the hardware of a localization system.

Furthermore, the embodiment of the present invention in which the receivers of the localization infrastructure include fixed receivers and mobile receivers consisting of mobile radio communication devices at least temporarily present in the environment and localized therein, advantageously allows to minimize the number of receivers installed in the environment.

Thanks to the use of accurate signal filtering techniques and advanced methodologies for solving the multilateration problem, the present invention minimizes the structural complexity and costs of technology even in locating people, equipped with personal mobile radio communication devices.

In its practical embodiment, the method for locating objects according to the present invention is implemented in a localization system based on the installation of a beacon (transmitter) on the object to be located, whose signal is detected by an array of fixed Bluetooth antennas (receivers), installed in the localization environment. The radio waves transmitted by the transmitter beacon and detected by the antennas are collected in a database and the position calculation is performed by a server connected to the database. In the hybrid embodiment, in which the object locating method also makes use of mobile communication devices, the radio waves transmitted by the beacon (transmitter) and detected by the fixed Bluetooth antenna array and by the mobile communication devices are collected in the database and the position calculation is performed by the server connected to the database, exactly as in the previous case.

The algorithm underlying the localization process, which is the same involved in locating people and objects, bases the calculation of the position of the entity to be tracked on an N-tuple of detected RSSI values of the identification signals emitted by the transmitters of the system (the array of fixed beacons, installed in the localization environment, for locating people, or the transmitter coupled to the object to be located) where N is the number of the reference anchors belonging to the localization system.

Advantageously, if the reference anchors are made using transmitters (beacons), these are low-cost and always detectable sensors, such as beacons in "Bluetooth 4" technology of the "Low-Energy" type, complying with the iBeacon protocol, for example beacon available on the market, which determines a concrete minimization of the energy consumption of the localization system and, in a correlated way, of the electromagnetic pollution in the localization environment, always maximizing the degree of reliability and precision of the system and allowing a real-time tracking of the actual position of the entity to be located, even inside closed spaces.

BRIEF DESCRIPTION OF THE FIGURES

Further characteristics and advantages of the invention will be set out in more detail in the following detailed description of its embodiments, given by way of non-limiting example, with reference to the attached drawings, in which.

DETAILED DESCRIPTION

Figure 1:
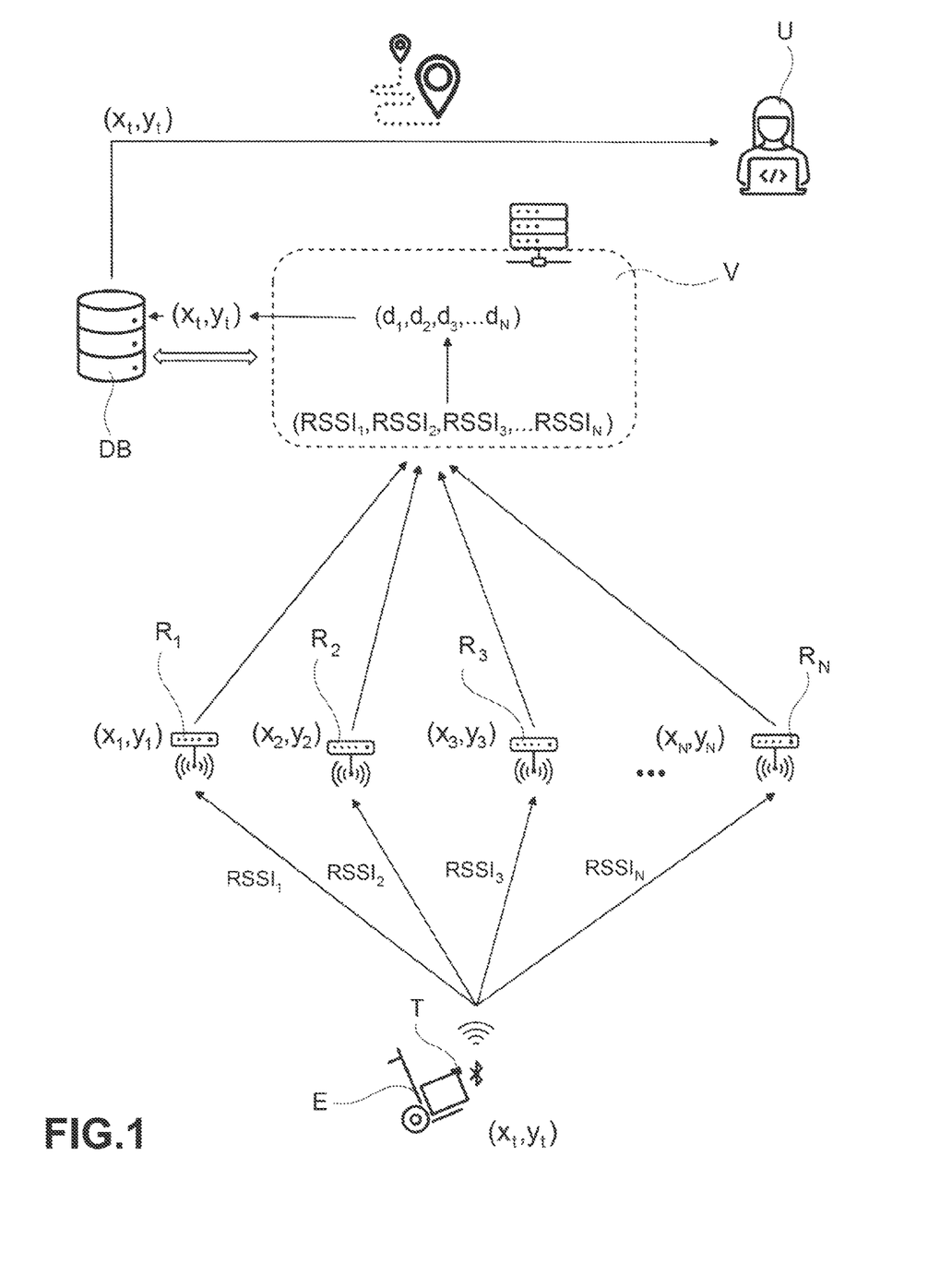
FIG. 1 is a schematic representation of an object localization system according to a first embodiment of the invention.

With reference to FIG. 1, a system for locating an object E in a confined environment is essentially shown, comprising transmitter means T coupled to said object adapted to periodically broadcast an electromagnetic identification signal S, for example according to a Bluetooth protocol, and a localization infrastructure including a plurality of electromagnetic signal receivers R in said environment, adapted to detect said identification signal over time. For the purposes of the invention, The R receivers are preferably three or more in number.

In the figure, the receivers R are indicated $R_1$, $R_2$, $R_3$, ..., $R_N$ and are marked by the coordinates of their position in a reference system x, y of the environment, respectively $(x_1, y_1)$, $(x_2, y_2)$, $(x_3, y_3)$, ..., $(x_N, y_N)$. Each of them receives the electromagnetic identification signal S emitted by the transmitting means T coupled to the object E, at different times and with different strengths due to its distance from the object. The strength of the received identification signal is respectively indicated $RSSI_1$, $RSSI_2$, $RSSI_3$, ..., $RSSI_N$.

The receivers R are in connection with a server V, associated with a database DB, and are arranged to determine a plurality of identification data indicative of the strength of the received identification signal, starting from a plurality of identification signals received in a predetermined time interval or starting from a predetermined plurality of identification signals received over time. For each receiver $R_i$ with i=1, ..., N and N preferably greater than or equal to three, the identification data indicative of the strength of successive instances of the identification signal S periodically broadcast over time are indicated $RSSI_{1i}$, ..., $RSSI_{Mi}$, where M is the number of instances of the identification signal considered and therefore the number of identification data. The plurality of identification data $RSSI_{1i}$, ..., $RSSI_{Mi}$ forms an identification vector.

Advantageously, each identification data element is also associated with the current position of the relative receiver $R_1$, indicated $(x_i, y_i)$ and with a timestamp of detection of the related identification signal S (of each instance of the signal). In the case of simultaneous identification of a plurality of objects, an identification code of the object or of the transmitter associated with the object is also associated with each identification data element.

The server V is programmed to perform a method according to the invention, which will be described in detail below, thus determining the distance between the position of the object E (indicated by the coordinates $x_t, y_t$) and the position of each of said receivers $R_i$, indicated respectively $d_1$, $d_2$, $d_3$, ..., $d_N$, based on the strength of the received identification signal.

Figure 2:
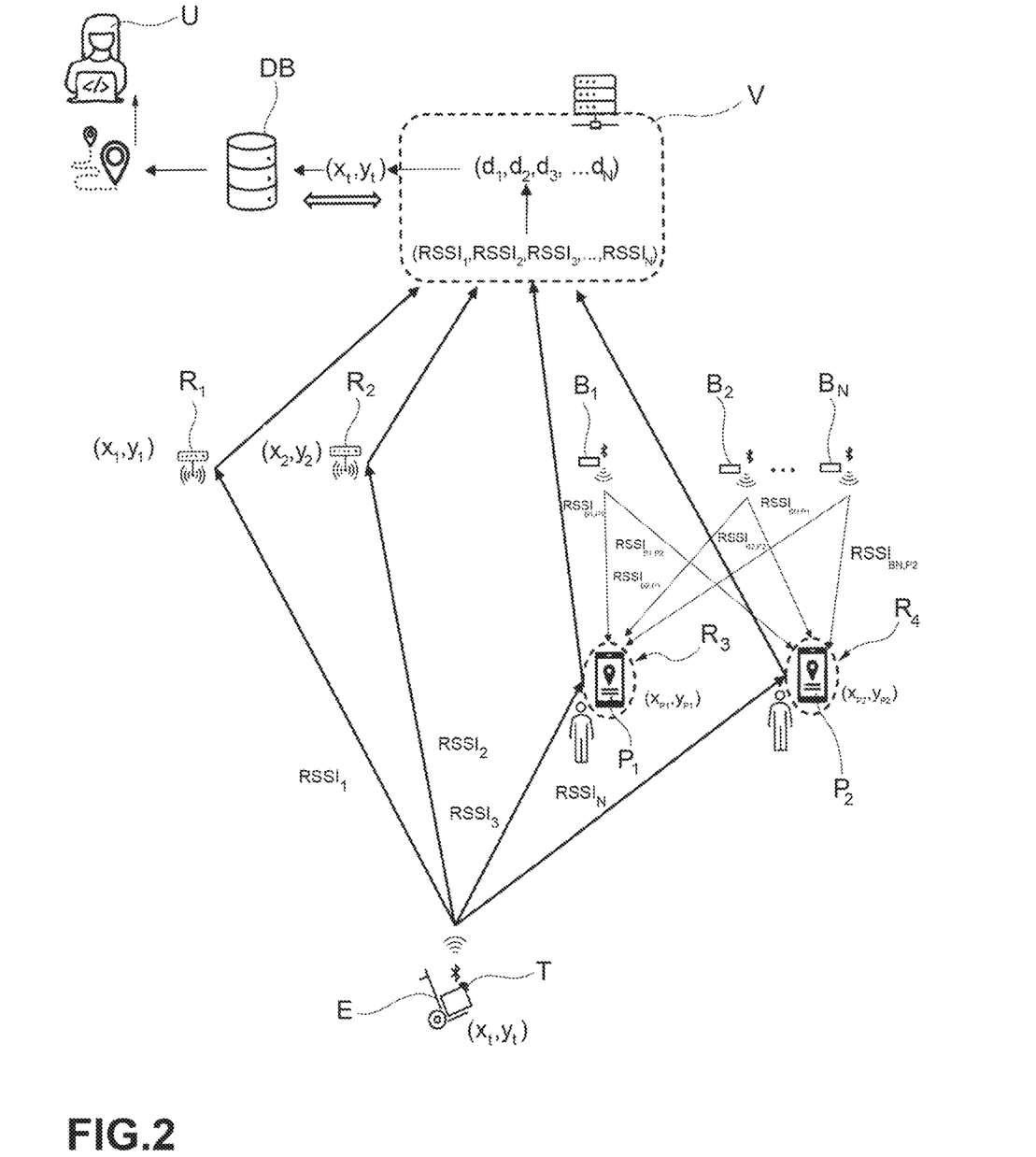
FIG. 2 is a schematic representation of an object location system in a second embodiment of the invention.

With reference to FIG. 2, a system for locating an object E in a confined environment is essentially shown, comprising transmitter means T coupled to said object adapted to periodically broadcast an electromagnetic identification signal S, for example according to a Bluetooth protocol, and a localization infrastructure including a plurality of electromagnetic signal receivers R in said environment, which includes a first subset of fixed receivers, installed in predetermined sites of the environment, indicated with $R_1$ and $R_2$ and a second subset of mobile receivers within the environment, $R_3$ and $R_4$, which includes (or which are included in) mobile radio communication devices at least temporarily present in the environment and localized in it, indicated with $P_1$, and $P_2$. The mobile radio communication devices $P_1$, and $P_2$ are preferably personal mobile radio communication devices in the possession of users or associated with moving means at least temporarily present in the environment.

In FIG. 2 elements or components identical or functionally equivalent to those illustrated in FIG. 1 have been indicated with the same references already used in the description of FIG. 1, and everything that will not be described again is intended to be replicated according to the teachings provided with reference to the FIG. 1, to the extent that they are not incompatible therewith.

The mobile radio communication devices $P_1$, and $P_2$ are localized in the environment (at positions $x_{P1}$, $y_{P1}$ and $x_{P2}$, $y_{P2}$) by any localization method, for example a method according to the invention, starting from a localization infrastructure including a plurality of transmitters $B_1$, ..., $B_N$ of electromagnetic signals in said environment, installed in predetermined sites of said environment (whose positions are indicated $x_{B1}$, ..., $x_{BN}$) and adapted to broadcast an identification signal $S_B$ over time, for example according to a Bluetooth protocol, adapted to be detected by the receiving means integrated in the mobile radio communication devices (and not shown here).

For the purposes of the invention, the transmitters $B_1$, ..., $B_N$ are preferably three or more in number.

The mobile radio communication devices $P_1$ and $P_2$ are arranged to determine a plurality of identification data indicative of the strength of the received identification signal, starting from a plurality of identification signals received in a predetermined time interval or starting from a predetermined plurality of identification signals received over time. For each transmitter $B_i$ with i=1, ..., N and N preferably greater than or equal to three, the identification data indicative of the strength of successive instances of the identification signal S periodically broadcast over time can be indicated $RSSI_{1i}$, ..., $RSSI_{Mi}$, where M is the number of instances of the identification signal considered and hence the number of identification data. The plurality of identification data $RSSI_{1i}$, ..., $RSSI_{Mi}$ forms an identification vector. This notation, completely identical to the notation referred to with reference to the localization of an object, allows a single treatment of the data processing aspects, which will be described in more detail below.

With reference to the architecture of FIG. 1, the transmitter T associated with the object E transmits the identification signal which is detected by the N receivers whose position is known. Each receiver sends the RSSI value relating to the detected signal to server V, for example a server in the cloud, associated with the database DB for storing the detections, and on which a program is installed for carrying out the localization method. The server is programmed to associate a vector of RSSI values to the detection, which will be transformed into a vector of distances, from which the position of the object E is calculated. The calculated coordinates are then stored in the database DB which represents the source of location information in real time for presentation to a user, for example location information can be shown on screen on a web portal or on an application residing on a smart device owned by a user U.

With reference to the architecture of FIG. 2, the transmitter T associated with the object E transmits the identification signal which is detected by the N receivers whose position is known. The receivers comprise two fixed receivers and two mobile receivers. Each receiver sends the RSSI value relating to the detected signal to server V, for example a server in the cloud, associated with the database DB for storing the detections, and on which a program for carrying out the localization method is installed. In the case of receivers $R_1$ and $R_2$ the position is fixed and known a priori. In the case of the receivers $R_3$ and $R_4$, implemented by the mobile radio communication devices $P_1$ and $P_2$, each of them sends identification data of the same type to the server with the only difference that the position of the receiver is not fixed and is not known to priori, but calculated, for example on the mobile radiocommunication device $P_1$ and $P_2$ itself thanks to the presence of the $B_t$ Beacon transmitters of the infrastructure, which can also be integrated with the receivers $R_1$ and $R_2$. As in the previous case, the program for performing the localization method present on the server associates a vector of RSSI values to the scan, which will be transformed into a vector of distances, starting from which the position of the object E to be located is calculated. The calculated coordinates are then stored in the database DB which represents the source of location information in real time for presentation to a user, for example the location information can be shown on screen on a web portal or on a resident application on a smart device owned by a user U.

Figure 3:
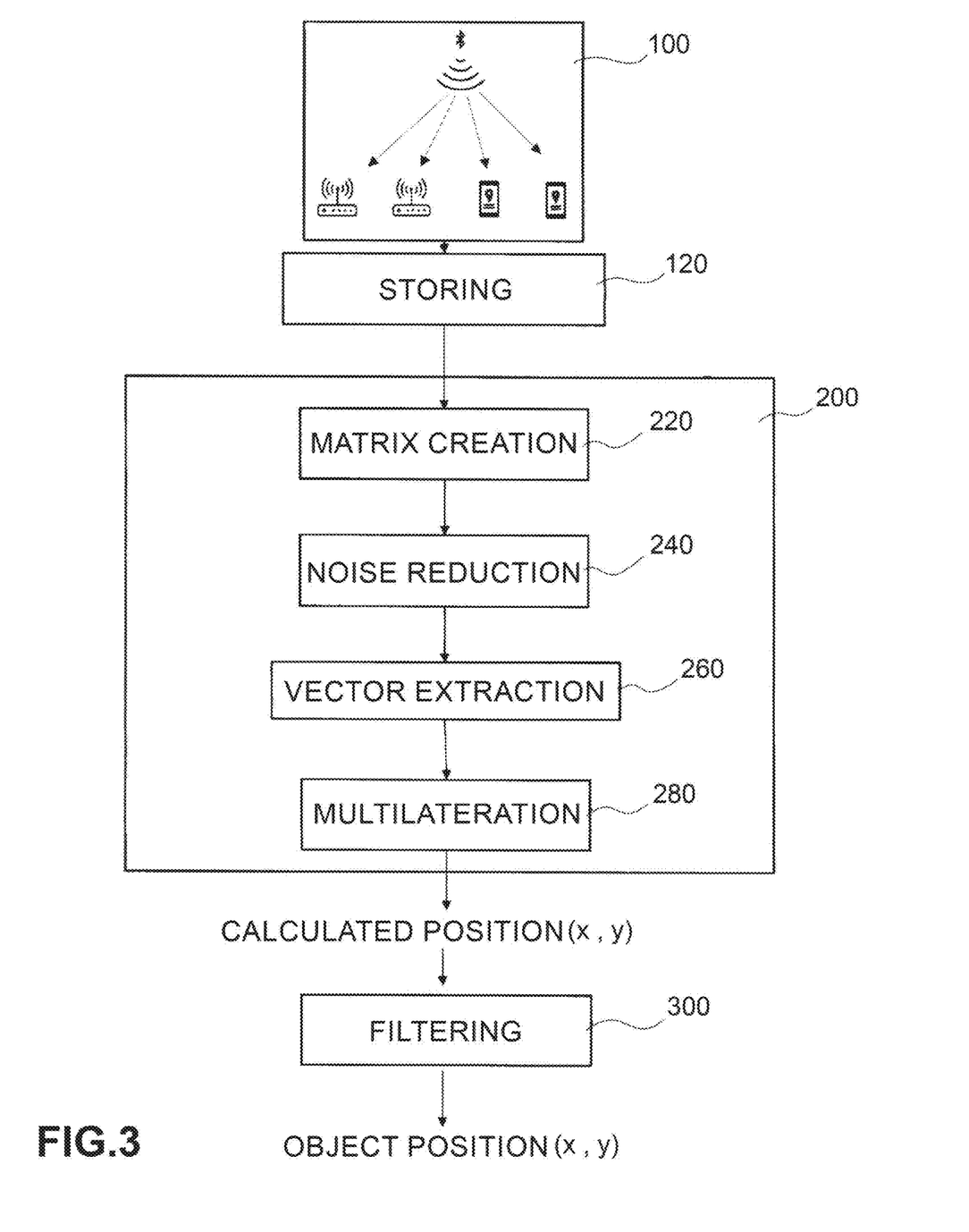
FIG. 3 is a flow chart of the operations of the localization methods of the invention.

FIG. 3 shows a flow diagram of the operations of the localization methods of the invention.

At step 100 the identification signals transmitted by the object E to be located (i.e., by the transmitter previously associated with it) are scanned by the receivers R, which determine a corresponding plurality of identification data indicative of the strength of the identification signal received over time which in step 120 are transmitted and stored in the database DB.

The set of steps indicated with 200 in the box includes the operations that, starting from the identification data stored in the database DB, provide the position of the object E as the final result.

Assuming that one wishes to identify the position of an object E, to which a transmitter (Bluetooth Beacon) T is coupled, the first step of the localization algorithm 220 consists in receiving the identification signals S transmitted by the transmitter T of the object E to be located, through N reference anchors (receivers). The term "reference anchors" will refer from now on to receivers R or to the set of receivers R and mobile radio communication devices P.

With the reception of the identification signals S, M values of signal strength are acquired, indicated $RSSI_j$, with $j=1, \ldots, M$, greater than a determined threshold, detected by each receiver. The number M of acquisitions is the number of acquisitions in a predetermined time interval, or a predetermined plurality of identification signals received over time. For example, if a transmitter is configured to emit an identification signal every 25 ms and the number of samples of the identification signal is preset to 10, each receiver, always listening, receives and sends to the server and to the associated database all the RSSI values detected at a constant scanning step every p seconds, with p preferably greater than or equal to 1 second, so that the identification data matrix contains the readings of a scan of 2.5 seconds long. At this point the identification data of the obtained identification data matrix can be associated with the current position of the related receiver and with a timestamp of detection of the related identification signal. In this way, a detection matrix is created, i.e., an identification data matrix, N×M, where N is the number of receivers, which is continuously updated by replacing the vector of older detections with the vector of more recent detections, and is stored continuously in the database DB.

It is hence possible to associate the following matrix to a scan:

$$R = \begin{pmatrix} RSSI_{11} & \ldots & RSSI_{1N} \\ \ldots & \ldots & \ldots \\ RSSI_{M1} & \ldots & RSSI_{MN} \end{pmatrix}$$

The localization procedure is performed periodically and cyclically on the identification data stored in the database and coming from the reference anchors at each cycle, so that at the i-th cycle there are N M-tuple, (one M-tuple for each anchor reference) and the N×M matrix is subjected to the noise filtering procedure of the next step.

Advantageously, the number of receivers is chosen on the basis of the size of the localization environment, while the scanning step, the size of the matrix, the duration of the acquisition interval of the identification signals and the threshold for the strength values of the identification signals are calibrated experimentally according to the environment and localization conditions, for example if it is necessary to provide the position data in a near real-time condition accepting a lower accuracy, or if greater accuracy and stability are required, but accepting a lower calculation frequency.

The obtained identification data matrix R $$R = \begin{pmatrix} RSSI_{11} & \ldots & RSSI_{1N} \\ \ldots & \ldots & \ldots \\ RSSI_{M1} & \ldots & RSSI_{MN} \end{pmatrix}$$

is subjected to filtering for noise reduction at step 240 thus obtaining an identification data matrix with reduced noise, i.e., whose data representing the strength of the identification signals detected over time contain a lower percentage of noise than the original signals.

The filtering procedure returns a similar matrix at the output, containing however a lower percentage of noise, from which a characteristic vector of RSSI values representative of the detection carried out is extracted.

As an example, two alternative filtering techniques are cited, which can be used according to the computing power available at the localization system, the truncated Singular Value Decomposition (SVD), a linear dimensionality reduction technique, and the Denoising autoencoder, a technique based on a class of neural networks. Both filters act on the overall matrix taking into account, in addition to the individual detections, the correlation between them. The detections relating to all objects at the same time are then considered if there are several objects to be localized in an environment.

The SVD technique is a very effective technique of linear algebra, which provides the matrix of minor rank that best approximates the original.

Given a matrix A of size m×n, with m>n, there is a factorization of the same, in the form:

$$A = U\Sigma V^T$$

being U and V the unit matrices of dimensions m×m and n×n respectively, $V^T$ the transpose of V, $\Sigma$ a rectangular diagonal matrix of dimensions m×n, which has non-zero elements only when the row and column indices coincide. The matrix $\Sigma$ is, therefore, of the form:

$$\begin{pmatrix} \sigma_1 & \ldots & 0 \\ \ldots & \ldots & \ldots \\ 0 & \ldots & \sigma_n \\ 0 & 0 & 0 \\ 0 & 0 & 0 \end{pmatrix}$$

whose non-zero values are in descending order $\sigma_1 \geq \sigma_2 \geq \ldots \geq \sigma_n \geq 0$ and are called singular values of A. Since m>n, the SVD of A can be represented in the following form:

$$A_{m \times n} = U_{m \times n} \times S_{n \times n} \times V_{n \times n}^T$$

where $S_{n \times n} = \text{diag}(\sigma_1, \sigma_2, \ldots, \sigma_n)$. This representation is called the "thin SVD" of A. The singular value decomposition returns the rank of the matrix, in fact the number of singular values of A is the rank of A.

Let r be the rank of the matrix, then its corresponding SVD is written:

$$A = U_{m \times r} \times S_{r \times r} \times V_{r \times n}^T$$

$$A = \sum_{i=1}^{r} \sigma_i u_i v_i$$

where $u_1, u_2, \ldots, u_r$ are the columns of $U_{m \times r}$ and $v_1, v_2, \ldots, v_r$ are the columns of $V_{n \times r}$.

The approximation of rank k (also called truncated or partial SVD) of A, $A_k$ with k<r, is given by zeroing the r−k singular values of A, that is:

$$A_k = U_{m \times k}(S_k)_{k \times k} V_{k \times n} = \sum_{i=1}^{k} \sigma_i u_i v_i^T$$

The value of the individual $\sigma_i$ is linked to the amount of information contained within the member $\sigma_i u_i v_i^T$ with respect to the totality of information contained within the matrix A.

The following describes how to implement the truncated SVD technique in the filtering procedure.

Considering R, the matrix of the detections to be subjected to filtering by SVD, and choosing Alpha, the percentage of variance to be kept, i.e., the amount of information contained in the matrix, K, the number of components to be kept within the truncated SVD, is calculated. Then, a return to the initial dimensional situation is made, performing the inverse of the SVD to return to a matrix of M×N dimensions, but containing less noise than the original.

So, it is obtained the matrix:

$$R' = \begin{pmatrix} RSSI'_{11} & \ldots & RSSI'_{1N} \\ \ldots & \ldots & \ldots \\ RSSI'_{M1} & \ldots & RSSI'_{MN} \end{pmatrix}$$

Autoencoders are a class of neural networks that have the aim of recreating the data provided at the input through back-propagation techniques. In detail, an Autoencoder comprises two parts, an encoder and a decoder, the encoder reads the input and compresses it into a compact representation (latent representation), the decoder reads the compact representation and recreates the input. In other words, the Autoencoder tries to learn the identity function by minimizing the error during the data reconstruction process; it therefore has an intrinsic ability to learn the latent compact representation of data.

Autoencoders can be thought of as two neural networks, the first consists of the encoder, the second of the decoder. The encoder takes in a set of data x and transforms it through the transformation h:

$$y = h(x)$$

The decoder takes the encoded signal y as an input and decodes it through another transformation f:

$$r = f(y) = f(h(x))$$

being r the signal reconstructed by the Autoencoder.

By defining the error e, as the difference between the original signal and the reconstructed signal:

$$e = x - r$$

the network gets trained and learns by reducing the chosen loss function (for example the standard deviation).

Denoising Autoencoders belong to the Autoencoder class, but the size of the hidden layer is greater than that of the input layer. A Denoising Autoencoder learns to recognize and remove the noise from the set of input data starting from an input consisting of the clean signal (x) to which a percentage of noise (N) is added.

Following the transformations of the decoder and the encoder, the reconstructed signal is obtained $$r = f(h(x+N))$$

By means of the back-propagation, the Autoencoder tries to reconstruct, from the corrupted input, the clean data set, minimizing the loss function relating to the error:

$$e = x - r$$

Through this process, the Autoencoder is stimulated to learn a function that removes the noise from the input data set.

This type of learning presupposes having a large amount of clean signal available to which noise is artificially added, to be supplied to the auto-encoder in the training phase.

In this case, it is not possible to have a clean signal. The idea is therefore to add noise N to the real signal $x_{real}$ (therefore naturally corrupted) and run the training step with the aim of minimizing the loss function relating to the error $$e = x_{real} - f(h(x_{real} + N))$$

Assuming that the added noise N is of the same type as that present in $x_{real}$, it is assumed that the autoencoder is able to learn a latent representation of the relationships between the various receivers and to reduce the percentage of noise present on $x_{real}$. In the specific use case, $x_{real}$, consists of the detection matrix $$R = \begin{pmatrix} RSSI_{11} & \ldots & RSSI_{1N} \\ \ldots & \ldots & \ldots \\ RSSI_{M1} & \ldots & RSSI_{MN} \end{pmatrix}$$

The currently preferred Autoencoder includes 2 dense layers, one with a 'sine' activation function and the other with a linear activation function. A periodic activation function was chosen for the implicit representation of the network because it is more suitable for the representation of natural signals and their derivatives.

Subsequently, in step 260 a characteristic identification vector is extrapolated that best represents the information contained in the identification data matrix.

After the filtering, the matrix that is thus obtained is:

$$R' = \begin{pmatrix} RSSI'_{11} & \ldots & RSSI'_{1N} \\ \ldots & \ldots & \ldots \\ RSSI'_{M1} & \ldots & RSSI'_{MN} \end{pmatrix}$$

Containing a lower percentage of noise than the matrix R.

From the last lines of the matrix obtained, for example from the last two lines, which correspond to the most recent detections available, a characteristic identification vector is extrapolated containing the definitive RSSI values, which characterize the detection in question.

The characteristic identification vector, which will be the input to the next phase of the multilateration procedure, is for example defined as follows, i.e., the vector r' is made up of the average of the last two rows of the matrix R':

$$r' = \left( \frac{RSSI'_{M-1,1} + RSSI'_{M,1}}{2}, \ldots, \frac{RSSI'_{M-1,N} + RSSI'_{M,N}}{2} \right)$$

Figure 4:
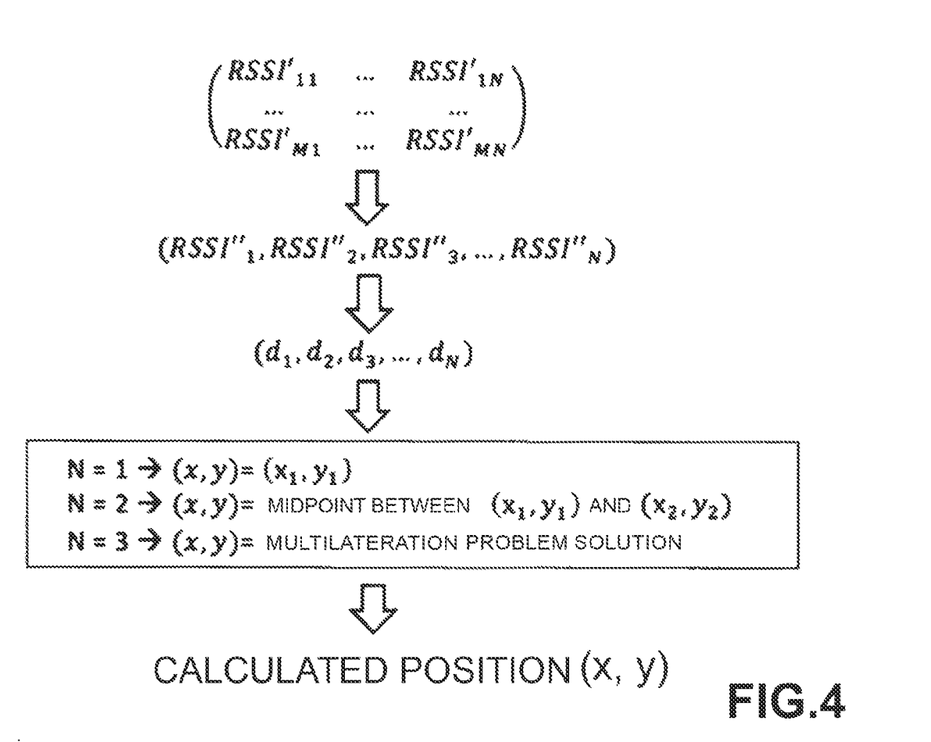
FIG. 4 is a detail of some steps of the flow chart of FIG. 4.

Steps 240 and 260 are schematized in the notation of FIG. 4.

Figure 5:
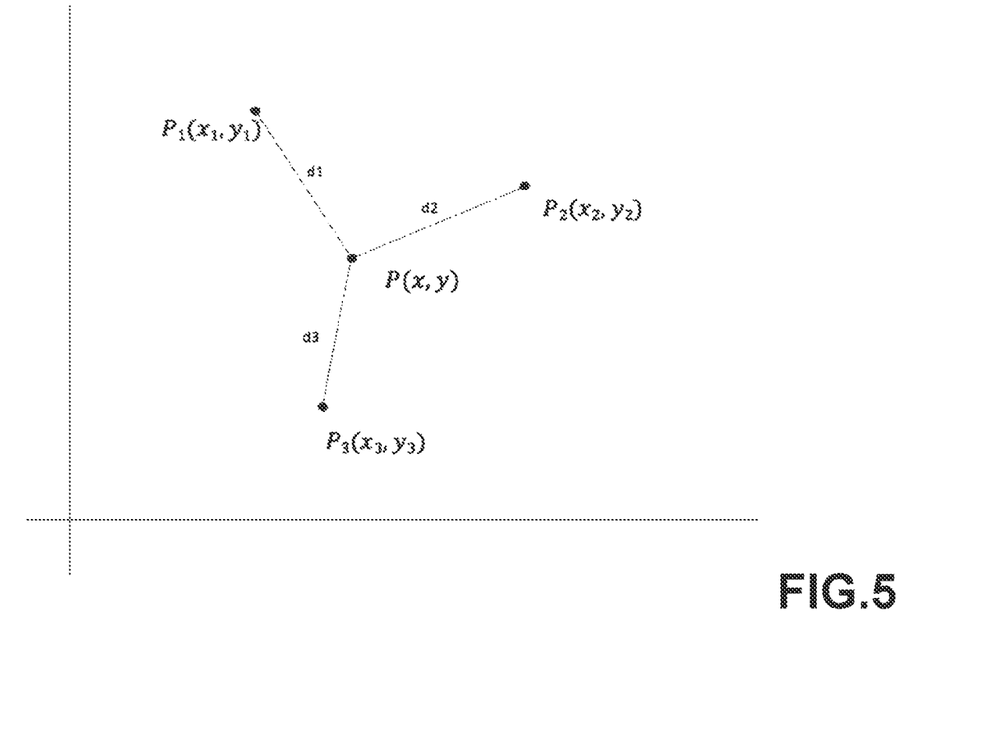
FIG. 5 represents a standard configuration of a trilateration problem.

At step 280 the operations which calculate the position of the object from the characteristic identification vector are carried out. Specifically, from each value representative of the strength of the identification signals received, the distance between the object E and each receiver of the localization infrastructure that has received an identification signal emitted by the transmitter associated with the object with strength above the threshold is calculated, thus transforming the vector of RSSI values into a vector of distances. Starting from the calculated distance data, least squares optimization techniques are implemented for the resolution of a multilateralization problem between the positions of the receivers and the position of the object (unknown) and for the consequent calculation of the coordinates the position of the object. The standard configuration of a trilateration problem with three receivers (reference anchors) is shown in FIG. 5.

Be it assumed that each irreducible area of the environment, that is, each minimum area that is not intended to be further subdivided, corresponds to a respective point of a map of the environment, uniquely identified by the pair of coordinates (x, y) in a predetermined reference system of the environment.

Let P be the target point whose coordinates (x, y) are to be determined and let $P_i(x_i, y_i)$, being $i \in (1, \ldots, N)$ the known positions of the reference anchors.

In order to set up an optimization problem, whose minimum returns the position P (x, y) of the target point, the following system of equations is set up:

$$\begin{cases} (x_1 - x)^2 + (y_1 - y)^2 - d_1^2 = e_1 \\ (x_2 - x)^2 + (y_2 - y)^2 - d_2^2 = e_2 \\ (x_3 - x)^2 + (y_3 - y)^2 - d_3^2 = e_3 \end{cases}$$

Each equation of the system is the result of applying the Pythagorean theorem to each single right triangle which has the hypotenuse $d_i$, with $i \in (1, 2, 3)$.

In order to choose the coordinates (x, y) such that the sum of the rejects is minimal, the following function is defined:

$$f : R^2 \rightarrow R^3$$

being:

$$f(x,y) = (f_1(x,y), f_2 = (x,y), f_3(x,y)) = (x_1-x)^2 + (y_1-y)^2 - d_1^2, (x_2-x)^2 + (y_2-y)^2 - d_2^2, (x_3-x)^2 + (y_3-y)^2 - d_3^2)$$

The goal is to minimize the function $f$. The weighted norm $\|.\|w$ has been chosen as reference metric, and it is defined as follows $$\|f(x,y)\|_W^2 = f(x,y)^T \cdot W \cdot f(x,y)$$

and the weight matrix W is a diagonal one:

$$W = \begin{pmatrix} w_{11} & 0 & 0 \\ 0 & w_{22} & 0 \\ 0 & 0 & w_{33} \end{pmatrix}$$

The problem then boils down to solving the following minimum problem:

$$(x',y') = S(x,y)$$

being $$S(x, y) = \|f(x, y)\|_W^2 = \sum_{i=1}^{3} w_{ii} f_i^2(x, y)$$

For the sake of simplicity, the case with the minimum number of reference anchors necessary to set up a trilateration problem was presented. Indeed, in real cases, the reference anchors are, in most cases, more than three. The generalization of the minimum problem is expressed by the following formula:

$$S(x, y) = \|f(x, y)\|_W^2 = \sum_{i=1}^{3} w_{ii} f_i^2(x, y)$$

The search for the coordinates of the position point of the object is then led back to the solution of a nonlinear least squares optimization problem.

The preferred method for solving this problem is the Levenbarg-Marquardt method. To set the function to be minimized, it is necessary to know the following elements:
the coordinates of the reference anchors (xi, yi) with $i \in (1 \ldots, N)$,
the distances between the target point and each reference anchor di with $i \in (1, \ldots, N)$,
the weights $w_{ii}$ with $i \in (1, \ldots, N)$.

The coordinates of the reference anchors are known, as they are recorded when the technology is installed.

Considering the characteristic identification vector r'= $(RSSI_1', \ldots, RSSI_N')$ that identifies a detection relating to a given position, we define below the formulas for obtaining the related distances di and the related weights Wi with $i \in (1, \ldots, N)$.

The distance between the target point and the i-th reference anchor is calculated with the following formula $$d_i = \begin{cases} \left(\dfrac{rssi_i}{TxPower_i}\right)^{C_1} & se \dfrac{rssi_i}{TxPower_i} \leq 1 \\ C_2\left(\dfrac{rssi_i}{TxPower_i}\right)^{C_3} + C_4 & se \dfrac{rssi_i}{TxPower_i} > 1 \end{cases}$$

where $TxPower_i$ indicates the RSSI value expected at a distance of one meter from the transmitter and $C_1, C_2, C_3, C_4$ are constants obtained experimentally. The values for the weights wii are experimentally optimized and are calculated using a formula which expresses an inversely proportional non-linear relationship of decreasing type between the distance and the relative weight. The solution of the minimum problem will be the calculated position.

The position of the object thus obtained is preferably subjected in step 300 to the application of a particle filter, that is a sequential Monte Carlo method, to obtain a definitive position as accurate as possible.

It is a post processing technique which acts on the positions, unlike the SVD and Autoencoder filters which act on the RSSI readings which are used to calculate the position.

The general structure of the particle filter consists of the following steps:

1) generating a set of particles which in the present case consist of a predetermined set of discrete positions on the map. Each particle is associated with a weight (a probability) which quantifies how much that position is close to the real position of the entity being traced. The initialization of the particles takes place with weights of equal measure before starting the localization method;
2) moving the particles with respect to a random orientation and a pre-defined step, where the orientation can be given by the gyroscope in the case of localization of a mobile radio communication device or fixed and pre-defined in the case of localization of an object;
3) updating the particle weights based on the position measurements at the current state and on the information relating to the map (presence of walls and obstacles in the environment, to whose corresponding points a null probability is associated).
4) rejecting the particles with weight=0 and replacing them with copies of the most probable particles; and
5) calculating the weighted center of gravity of the particles, that is the weighted average of their coordinates for the relative probabilities to obtain the final estimate of the position of the object. Particle probabilities are built from a predetermined sequence of measurements over time. For example, if the position calculated at time tn is subjected to the particle filter, this position is surrounded by a set of other positions (particles) for each of which a weight is calculated based on the previously calculated positions (for example, at the times tn−5, tn−4, tn−3, tn−2, tn−1) and on the presence of walls and obstacles on the map. Therefore, the set of points whose centre is calculated is formed by the particles created and weighed on the basis of the state of the previous particle system.

Each calculated position is therefore affected by the previous measurements. This leads to an increase in the stability of the process result.

Of course, the principle of the invention remaining the same, the embodiments and the particular implementations may be widely varied with respect to what has been described and illustrated purely by way of non-limiting example, without thereby departing from the scope of protection of the invention defined by the attached claims.

What is claimed is:

1. A method for locating a mobile radio communication device in a confined environment, in particular a personal mobile radio communication device in possession of a user, equipped with receiving means for receiving electromagnetic signals, the method comprising:

providing a localization infrastructure including a plurality of transmitters of electromagnetic signals in said confined environment, installed in predetermined sites of said confined environment, said transmitters each being adapted to periodically broadcast a respective electromagnetic identification signal, adapted to be detected by said receiving means of the mobile radio communication device;

determining, by said receiving means of the mobile radio communication device, a plurality of identification data indicative of a strength of a received electromagnetic identification signal, starting from a plurality of received electromagnetic identification signals, from at least three transmitters of said plurality of transmitters, in a predetermined time interval or starting from a predetermined plurality of electromagnetic identification signals received over time;

wherein respective pluralities of identification data acquired from said at least three transmitters form an identification data matrix;

reducing noise from the identification data matrix to obtain an identification data matrix with reduced noise;

extracting from said identification data matrix with reduced noise a characteristic identification vector including a characteristic identification data element for each of said at least three transmitters; and determining position coordinates of said mobile radio communication device in a predetermined reference system of the confined environment to which the transmitters belong, by minimizing an error in calculating distances between a position of said mobile radio communication device and a position of each of said at least three transmitters in solving a multilateration problem in which distance between the position of said mobile radio communication device and the position of each of said at least three transmitters is determined according to a predetermined function of the characteristic identification data element of the respective transmitter, wherein minimizing the error in calculating the distances between the position of said mobile radio communication device and the position of each of said at least three transmitters comprises a resolution of a least squares optimization problem by minimization of a weighted norm of errors in calculating the distances defined as a weighted linear combination of the squares of said errors, in which values for weights are predetermined through an inversely proportional relationship between the distance and relative weight, and in which the distance between the position of said mobile radio communication device and the position of each one of said at least three transmitters is determined according to the relationship $$d_i = \begin{cases} \left(\dfrac{rssi_i}{TxPower_i}\right)^{C_1} & se \dfrac{rssi_i}{TxPower_i} \leq 1 \\ C_2\left(\dfrac{rssi_i}{TxPower_i}\right)^{C_3} + C_4 & se \dfrac{rssi_i}{TxPower_i} > 1 \end{cases}$$

where $TxPower_i$ is the value of the strength of an electromagnetic identification signal at a predetermined reference unitary distance from a transmitter of the localization infrastructure and $C_1$, $C_2$, $C_3$, $C_4$ are predetermined constants.

2. The method for locating a mobile radio communication device in a confined environment of claim 1, wherein each identification data element is also associated with a current position of the respective transmitter and a timestamp of detection of the respective electromagnetic identification signal.

3. The method for locating a mobile radio communication device in a confined environment of claim 1, wherein the receiving means of the mobile radio communication device are configured to determine an identification data element indicative of the strength of the received electromagnetic identification signal if the strength is greater than a predetermined threshold.

4. A method for locating an object in a confined environment, the method comprising:
providing transmitting means coupled to said object, adapted to periodically broadcast an electromagnetic identification signal;
providing a localization infrastructure including a plurality of receivers in said confined environment, said receivers being adapted to detect said electromagnetic identification signal over time;
determining, by at least three receivers of said plurality of receivers, a plurality of identification data indicative of a strength of a received electromagnetic identification signal, starting from a plurality of electromagnetic identification signals received in a predetermined time interval or starting from a predetermined plurality of electromagnetic identification signals received over time,
wherein respective pluralities of identification data acquired by said at least three receivers form an identification data matrix;
reducing noise from the identification data matrix to obtain an identification data matrix with reduced noise;
extracting from said identification data matrix with reduced noise a characteristic identification vector including a characteristic identification data element for each of said at least three receivers; and
determining position coordinates of said object in a predetermined reference system of the confined environment to which the receivers belong, by minimizing an error in calculating distances between a position of said object and a position of each said at least three receivers in solving a multilateration problem in which distance between the position of said object and the position of each of said at least three receivers is determined according to a predetermined function of the characteristic identification data element of the respective receiver,
wherein minimizing the error in calculating the distances between the position of said object and the position of each of said at least three receivers, comprises a resolution of a least squares optimization problem by minimization of a weighted norm of errors in calculating the distances defined as a weighted linear combination of the squares of said errors, in which values for weights are predetermined through an inversely proportional relationship between the distance and relative weight, and in which the distance between the position of said object and the position of each of said at least three receivers, is determined according to the relationship $$d_i = \begin{cases} \left(\frac{rssi_i}{TxPower_i}\right)^{C_1} & se \frac{rssi_i}{TxPower_i} \leq 1 \\ C_2\left(\frac{rssi_i}{TxPower_i}\right)^{C_3} + C_4 & se \frac{rssi_i}{TxPower_i} > 1 \end{cases}$$

where $TxPower_i$ is the value of the strength of an electromagnetic identification signal at a predetermined reference unitary distance from a transmitting means coupled to said object, and $C_1$, $C_2$, $C_3$, $C_4$ are predetermined constants.

5. The method for locating an object in a confined environment of claim 4, wherein said plurality of receivers of the localization infrastructure includes a first subset of fixed receivers, installed at predetermined sites in said confined environment, and a second subset of mobile receivers within said confined environment, said second subset of mobile receivers including mobile radio communication devices localized in said confined environment.

6. The method for locating an object in a confined environment of claim 5, wherein said second subset of mobile receivers includes personal mobile radio communication devices in possession of users localized by the method of claim 1.

7. The method for locating an object in a confined environment of claim 4, wherein each identification data element is also associated with a current position of the respective receiver, and a timestamp of detection of the respective electromagnetic identification signal.

8. The method for locating an object in a confined environment of claim 4, wherein each receiver of the plurality of receivers of the localization infrastructure is configured to determine an identification data element indicative of the strength of the received electromagnetic identification signal if the strength is greater than a predetermined threshold.

9. A method for locating a mobile radio communication device in a confined environment, in particular a personal mobile radio communication device in possession of a user, equipped with receiving means for receiving electromagnetic signals, the method comprising:
providing a localization infrastructure including a plurality of transmitters of electromagnetic signals in said confined environment, installed in predetermined sites of said confined environment, said transmitters each being adapted to periodically broadcast a respective electromagnetic identification signal, adapted to be detected by said receiving means of the mobile radio communication device;
determining, by said receiving means of the mobile radio communication device, a plurality of identification data indicative of a strength of a received electromagnetic identification signal, starting from a plurality of received electromagnetic identification signals, from at least three transmitters of said plurality of transmitters, in a predetermined time interval or starting from a predetermined plurality of electromagnetic identification signals received over time;
wherein respective pluralities of identification data acquired from said at least three transmitters form an identification data matrix;
reducing noise from the identification data matrix to obtain an identification data matrix with reduced noise;
extracting from said identification data matrix with reduced noise a characteristic identification vector including a characteristic identification data element for each of said at least three transmitters;
determining position coordinates of said mobile radio communication device in a predetermined reference system of the confined environment to which the transmitters belong, by minimizing an error in calculating distances between a position of said mobile radio communication device and a position of each of said at least three transmitters in solving a multilateration problem in which distance between the position of said mobile radio communication device and the position of each of said at least three transmitters is determined according to a predetermined function of the characteristic identification data element of the respective transmitter; and applying a sequential Monte Carlo method to the determined position coordinates of said device, the applying of the sequential Monte Carlo method comprising:

to each position of a predetermined set of discrete positions on a map of the confined environment, associating a weight indicative of a probability that said position corresponds to a real position of the device;

updating weights based on a predetermined succession of determinations of the position coordinates over time and on map information indicative of environmental structures incompatible with the position of said device; and calculating a weighted center of gravity of the positions to obtain a final estimate of the position of the device.

10. A method for locating an object in a confined environment, comprising:

providing transmitting means coupled to said object, adapted to periodically broadcast an electromagnetic identification signal;

providing a localization infrastructure including a plurality of receivers in said confined environment, said receivers being adapted to detect said electromagnetic identification signal over time;

determining, by at least three receivers of said plurality of receivers, a plurality of identification data indicative of a strength of a received electromagnetic identification signal, starting from a plurality of electromagnetic identification signals received in a predetermined time interval or starting from a predetermined plurality of electromagnetic identification signals received over time, wherein respective pluralities of identification data acquired by said at least three receivers form an identification data matrix;

reducing noise from the identification data matrix to obtain an identification data matrix with reduced noise;

extracting from said identification data matrix with reduced noise a characteristic identification vector including a characteristic identification data element for each of said at least three receivers;

determining position coordinates of said object in a predetermined reference system of the confined environment to which the receivers belong, by minimizing an error in calculating distances between a position of said object and a position of each said at least three receivers in solving a multilateration problem in which distance between the position of said object and the position of each of said at least three receivers is determined according to a predetermined function of the characteristic identification data element of the respective receiver; and applying a sequential Monte Carlo method to the determined position coordinates of said object, the applying of the sequential Monte Carlo method comprising:

to each position of a predetermined set of discrete positions on a map of the confined environment, associating a weight indicative of a probability that said position corresponds to a real position of the object;

updating weights based on a predetermined succession of determinations of the position coordinates over time and on map information indicative of environmental structures incompatible with the position of the object; and calculating a weighted center of gravity of the positions to obtain a final estimate of the position of the object.

11. A method for locating a mobile radio communication device in a confined environment, in particular a personal mobile radio communication device in possession of a user, equipped with receiving means for receiving electromagnetic signals, the method comprising:

providing a localization infrastructure including a plurality of transmitters of electromagnetic signals in said confined environment, installed in predetermined sites of said confined environment, said transmitters each being adapted to periodically broadcast a respective electromagnetic identification signal, adapted to be detected by said receiving means of the mobile radio communication device;

determining, by said receiving means of the mobile radio communication device, a plurality of identification data indicative of a strength of a received electromagnetic identification signal, starting from a plurality of received electromagnetic identification signals, from at least three transmitters of said plurality of transmitters, in a predetermined time interval or starting from a predetermined plurality of electromagnetic identification signals received over time;

wherein respective pluralities of identification data acquired from said at least three transmitters form an identification data matrix;

reducing noise from the identification data matrix to obtain an identification data matrix with reduced noise;

extracting from said identification data matrix with reduced noise a characteristic identification vector including a characteristic identification data element for each of said at least three transmitters, wherein the extraction of a characteristic identification vector includes an extraction for each transmitter of a predetermined plurality of identification data with reduced noise acquired in the most recent time and a calculation of a characteristic identification data element starting from said plurality of identification data with reduced noise; and determining position coordinates of said mobile radio communication device in a predetermined reference system of the confined environment to which the transmitters belong, by minimizing an error in calculating distances between a position of said mobile radio communication device and a position of each of said at least three transmitters in solving a multilateration problem in which distance between the position of said mobile radio communication device and the position of each of said at least three transmitters is determined according to a predetermined function of the characteristic identification data element of the respective transmitter.

12. The method for locating a mobile radio communication device in a confined environment of claim 11, wherein the calculation of a characteristic identification data element starting from said plurality of identification data with reduced noise includes calculating an average of said plurality of identification data with reduced noise acquired in the most recent time.

13. The method for locating a mobile radio communication device in a confined environment of claim 12, wherein said plurality of identification data with reduced noise acquired in the most recent time comprises the last two identification data elements with reduced noise acquired over time.

14. A method for locating an object in a confined environment, comprising:
providing transmitting means coupled to said object, adapted to periodically broadcast an electromagnetic identification signal;
providing a localization infrastructure including a plurality of receivers in said confined environment, said receivers being adapted to detect said electromagnetic identification signal over time;
determining, by at least three receivers of said plurality of receivers, a plurality of identification data indicative of a strength of a received electromagnetic identification signal, starting from a plurality of electromagnetic identification signals received in a predetermined time interval or starting from a predetermined plurality of electromagnetic identification signals received over time,
wherein respective pluralities of identification data acquired by said at least three receivers form an identification data matrix;
reducing noise from the identification data matrix to obtain an identification data matrix with reduced noise;
extracting from said identification data matrix with reduced noise a characteristic identification vector including a characteristic identification data element for each of said at least three receivers, wherein the extraction of a characteristic identification vector includes an extraction for each receiver of the plurality of receivers of a predetermined plurality of identification data with reduced noise acquired in the most recent time and calculation of a characteristic identification data element starting from said plurality of identification data with reduced noise; and
determining position coordinates of said object in a predetermined reference system of the confined environment to which the receivers belong, by minimizing an error in calculating distances between a position of said object and a position of each said at least three receivers in solving a multilateration problem in which distance between the position of said object and the position of each of said at least three receivers is determined according to a predetermined function of the characteristic identification data element of the respective receiver.

15. The method for locating an object in a confined environment of claim 14, wherein the calculation of a characteristic identification data element starting from said plurality of identification data with reduced noise includes calculating an average of said plurality of identification data with reduced noise acquired in the most recent time.

16. The method for locating an object in a confined environment of claim 15, wherein said plurality of identification data with reduced noise acquired in the most recent time comprises the last two identification data elements with reduced noise acquired over time.

17. A method for locating a mobile radio communication device in a confined environment, in particular a personal mobile radio communication device in possession of a user, equipped with receiving means for receiving electromagnetic signals, the method comprising:
providing a localization infrastructure including a plurality of transmitters of electromagnetic signals in said confined environment, installed in predetermined sites of said confined environment, said transmitters each being adapted to periodically broadcast a respective electromagnetic identification signal, adapted to be detected by said receiving means of the mobile radio communication device;
determining, by said receiving means of the mobile radio communication device, a plurality of identification data indicative of a strength of a received electromagnetic identification signal, starting from a plurality of received electromagnetic identification signals, from at least three transmitters of said plurality of transmitters, in a predetermined time interval or starting from a predetermined plurality of electromagnetic identification signals received over time;
wherein respective pluralities of identification data acquired from said at least three transmitters form an identification data matrix;
reducing noise from the identification data matrix to obtain an identification data matrix with reduced noise, wherein said noise reduction from the identification data matrix comprises a compact singular value decomposition of said identification data matrix resulting in a diagonal singular matrix, zeroing of a predetermined subset of singular values of said diagonal singular matrix and computation of an approximate identification data matrix of lower rank, in which the number of zero singular values is chosen according to the percentage of information contained in the identification data matrix;
extracting from said identification data matrix with reduced noise a characteristic identification vector including a characteristic identification data element for each of said at least three transmitters; and
determining position coordinates of said mobile radio communication device in a predetermined reference system of the confined environment to which the transmitters belong, by minimizing an error in calculating distances between a position of said mobile radio communication device and a position of each of said at least three transmitters in solving a multilateration problem in which distance between the position of said mobile radio communication device and the position of each of said at least three transmitters is determined according to a predetermined function of the characteristic identification data element of the respective transmitter.

18. A method for locating an object in a confined environment, comprising:
providing transmitting means coupled to said object, adapted to periodically broadcast an electromagnetic identification signal;
providing a localization infrastructure including a plurality of receivers in said confined environment, said receivers being adapted to detect said electromagnetic identification signal over time;
determining, by at least three receivers of said plurality of receivers, a plurality of identification data indicative of a strength of a received electromagnetic identification signal, starting from a plurality of electromagnetic identification signals received in a predetermined time interval or starting from a predetermined plurality of electromagnetic identification signals received over time,
wherein respective pluralities of identification data acquired by said at least three receivers form an identification data matrix;

reducing noise from the identification data matrix to obtain an identification data matrix with reduced noise, wherein said noise reduction from the identification data matrix comprises a compact singular value decomposition of said identification data matrix resulting in a diagonal singular matrix, zeroing of a predetermined subset of singular values of said diagonal singular matrix and computation of an approximate identification data matrix of lower rank, in which the number of zero singular values is chosen according to the percentage of information contained in the identification data matrix;

extracting from said identification data matrix with reduced noise a characteristic identification vector including a characteristic identification data element for each of said at least three receivers; and determining position coordinates of said object in a predetermined reference system of the confined environment to which the receivers belong, by minimizing an error in calculating distances between a position of said object and a position of each said at least three receivers in solving a multilateration problem in which distance between the position of said object and the position of each of said at least three receivers is determined according to a predetermined function of the characteristic identification data element of the respective receiver.

19. A method for locating a mobile radio communication device in a confined environment, in particular a personal mobile radio communication device in possession of a user, equipped with receiving means for receiving electromagnetic signals, the method comprising:

providing a localization infrastructure including a plurality of transmitters of electromagnetic signals in said confined environment, installed in predetermined sites of said confined environment, said transmitters each being adapted to periodically broadcast a respective electromagnetic identification signal, adapted to be detected by said receiving means of the mobile radio communication device;

determining, by said receiving means of the mobile radio communication device, a plurality of identification data indicative of a strength of a received electromagnetic identification signal, starting from a plurality of received electromagnetic identification signals, from at least three transmitters of said plurality of transmitters, in a predetermined time interval or starting from a predetermined plurality of electromagnetic identification signals received over time;

wherein respective pluralities of identification data acquired from said at least three transmitters form an identification data matrix;

reducing noise from the identification data matrix to obtain an identification data matrix with reduced noise, wherein reducing noise from the identification data matrix comprises applying a denoising autoencoder to said identification data matrix, which comprises a neural network that implements an encoder of the identification data matrix into a latent representation matrix of the identification data, and a decoder of said latent representation matrix of the identification data into an output identification data matrix with reduced noise by respective predetermined activation functions of weighted linear combinations of identification data of said identification data matrix and of said latent representation matrix of the identification data, in which said respective predetermined activation functions are a sine activation function and a linear activation function;

extracting from said identification data matrix with reduced noise a characteristic identification vector including a characteristic identification data element for each of said at least three transmitters; and determining position coordinates of said mobile radio communication device in a predetermined reference system of the confined environment to which the transmitters belong, by minimizing an error in calculating distances between a position of said mobile radio communication device and a position of each of said at least three transmitters in solving a multilateration problem in which distance between the position of said mobile radio communication device and the position of each of said at least three transmitters is determined according to a predetermined function of the characteristic identification data element of the respective transmitter.

20. The method for locating a mobile radio communication device in a confined environment of claim 19, wherein said denoising autoencoder is trained by feeding an input identification data matrix in which random noise components extracted from a Gaussian noise distribution are added to said identification data matrix, computing a reconstructed identification data matrix by the denoising autoencoder, and minimizing an error function which is the difference between the identification data matrix and the reconstructed identification data matrix.

21. A method for locating an object in a confined environment, comprising:

providing transmitting means coupled to said object, adapted to periodically broadcast an electromagnetic identification signal;

providing a localization infrastructure including a plurality of receivers in said confined environment, said receivers being adapted to detect said electromagnetic identification signal over time;

determining, by at least three receivers of said plurality of receivers, a plurality of identification data indicative of a strength of a received electromagnetic identification signal, starting from a plurality of electromagnetic identification signals received in a predetermined time interval or starting from a predetermined plurality of electromagnetic identification signals received over time, wherein respective pluralities of identification data acquired by said at least three receivers form an identification data matrix;

reducing noise from the identification data matrix to obtain an identification data matrix with reduced noise, wherein reducing noise from the identification data matrix comprises applying a denoising autoencoder to said identification data matrix, which comprises a neural network that implements an encoder of the identification data matrix into a latent representation matrix of the identification data, and a decoder of said latent representation matrix of the identification data into an output identification data matrix with reduced noise by respective predetermined activation functions of weighted linear combinations of identification data of said identification data matrix and of said latent representation matrix of the identification data, in which said respective predetermined activation functions are a sine activation function and a linear activation function;

extracting from said identification data matrix with reduced noise a characteristic identification vector including a characteristic identification data element for each of said at least three receivers; and determining position coordinates of said object in a predetermined reference system of the confined environment to which the receivers belong, by minimizing an error in calculating distances between a position of said object and a position of each said at least three receivers in solving a multilateration problem in which distance between the position of said object and the position of each of said at least three receivers is determined according to a predetermined function of the characteristic identification data element of the respective receiver.

22. The method for locating an object in a confined environment of claim 21, wherein said denoising autoencoder is trained by feeding an input identification data matrix in which random noise components extracted from a Gaussian noise distribution are added to said identification data matrix, computing a reconstructed identification data matrix by the denoising autoencoder, and minimizing an error function which is the difference between the identification data matrix and the reconstructed identification data matrix.

\* \* \* \* \*